United States Patent [19]

Hawkins

[11] 3,987,213
[45] Oct. 19, 1976

[54] PROCESS FOR THE PREPARATION OF PROTEINACEOUS EDIBLE ELEMENTS

[75] Inventor: Arthur Ernest Hawkins, Bedford, England

[73] Assignee: Lever Brothers Company, New York, N.Y.

[22] Filed: May 20, 1975

[21] Appl. No.: 579,293

[30] Foreign Application Priority Data

May 22, 1974 United Kingdom............ 22896/74

[52] U.S. Cl.............................. 426/656; 426/276; 426/515; 426/657
[51] Int. Cl.² .......................................... A23J 3/00
[58] Field of Search ........... 426/276, 274, 656, 657, 426/802

[56] References Cited

UNITED STATES PATENTS

| 3,863,016 | 1/1975 | Yamakami | 426/276 |
| 3,889,010 | 6/1975 | Grouwer | 426/276 |

Primary Examiner—A. Louis Monacell
Assistant Examiner—Esther L. Massung
Attorney, Agent, or Firm—Kenneth F. Dusyn; James J. Farrell; Melvin H. Kurtz

[57] ABSTRACT

Proteinaceous elements are produced by adding discrete portions, particularly drops of a coagulable protein solution, to a coagulating medium under conditions such that the material added is drawn out to form a product with a greatly increased surface area.

17 Claims, 2 Drawing Figures

PROCESS FOR THE PREPARATION OF PROTEINACEOUS EDIBLE ELEMENTS

BACKGROUND OF THE INVENTION

1. Field of the Invention

Attempts have been made to obtain fibres which can, for example, be used to impart a meat-like texture to foodstuffs. These attempts led to the development of methods for the production of rod-shaped fibres by e.g. spinning of (alkaline pH 9–13.5) protein-containing mixtures into acid/salt baths. It is, however, difficult to use such fibres which do not possess a fine structure in a formulation which will break down to a smooth, easily swallowed mass after chewing; moreover the extruded type of fibres does not retain liquids as well as natural muscle fibres do, so that reformed meat products or meat analogues frequently have an undesired mouth feel, principally because flavours and juices are quickly released and the fibres separate from the other components of the reformed meat and adhere to the surfaces of the mouth.

2. Description of Prior Art

In U.S. Pat. No. 3,674,500 there is described a method for the preparation of a foodstuff having a meat-like texture, by mixing a protein solution with a solution containing free calcium ions, rapidly reacting the mixture at a pH about 9, preferably between 11.0 and 12.0, which pH is considered to be important for obtaining a product of the desired texture, neutralizing the excess of alkali and filtering the coagulated protein material.

The process described for carrying out rapid reactions involves vigorous stirring on bringing the reactants into contact. The reactants are brought into contact by gradual addition of the protein solution to the coagulating bath containing calcium ions, the protein solution being extruded through a slit or porous plate. A serious disadvantage of the above procedure is that, particularly when applied to the interaction of protein-coagulating systems in which the pH is kept below about 8, it is difficult to obtain a product having a meat-like texture and, in the context of use with fats and other additives, reproducible release properties.

SUMMARY OF THE INVENTION

A process has now been found which avoids the disadvantages just described and which provides reproducible elements having a sequential breakdown during chewing which gives the customary mouth feel of meat. The process which comprises contacting a coagulable protein solution with a coagulating medium and collecting the obtained proteinaceous material is characterized in that discrete portions, particularly drops of the protein solution, are added to a relatively moving stream of coagulable medium under conditions such that the material added is drawn out to give a product with a greatly increased surface area as compared to the original material added.

DETAILED DESCRIPTION

Figure 1:
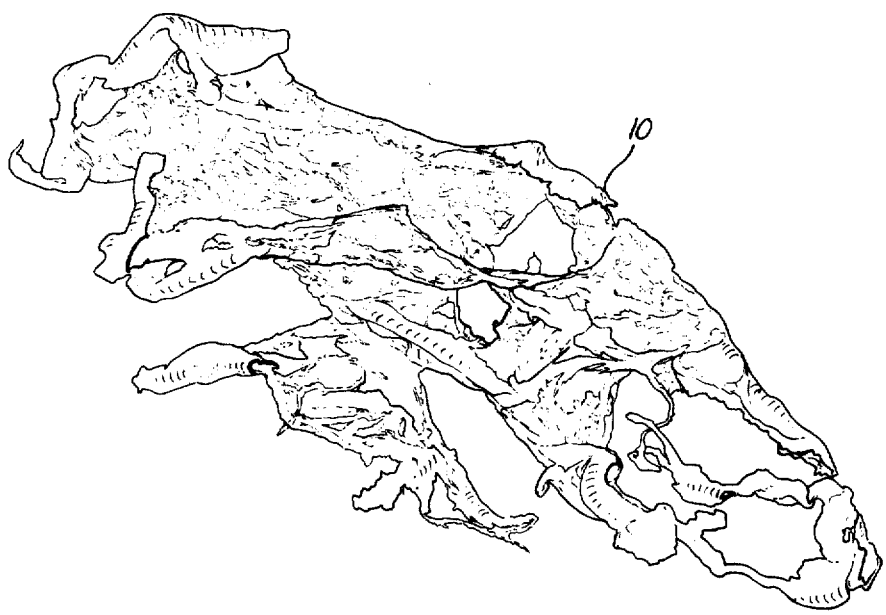
FIG. 1 shows a photograph of an unraveled element, obtained according to the invention.

The process of the present invention, which comprises contacting a coagulable protein solution with a coagulating medium and collecting the obtained proteinaceous material is characterized in that discrete portions, particularly drops of the protein solution are added to the coagulable medium under conditions such that the material added is drawn out to give a product with a greatly increased surface area as compared to the original material added. The coagulable protein used according to the process of the invention can be a protein from a vegetable source-like soya, field bean etc. or from an animal source-like blood-plasma, sarco plasmic proteins derived from muscle, fish-proteins etc.

In the process according to the invention globular proteins as well as myofibillar proteins or mixtures of both kinds can be used successfully.

As a coagulating medium, use can be made of a hot fluid like water, the temperature of which is chosen sufficient to coagulate the protein subjected to coagulation. In most cases a bath temperature between 70° and 100° C is suitable. When soya protein is introduced in water a temperature between 91°–98° C is preferably used. Coagulation of the protein can also be carried out in the presence of a salt of a divalent cation like calcium-chloride in a suitable concentration. This compound has been successfully used particularly when fish proteins or muscle proteins were used. The suitable concentration of calcium chloride can easily be determined in each case. A concentration of 10 mM calcium chloride kept constant in the bath proved to be useful in most cases.

Coagulation of the protein can also be carried out using other chemical agents like for instance an acid used for example in the form of an aqueous solution. The pH of the bath can be varied. A pH between 1 and 3 can be used in most cases. Coagulation can also be obtained combining the effect of heat and chemical agents.

The viscosity of the protein isolate added to the coagulation medium requires attention; if too low the solution disperses too rapidly in the hot water and the product is so fragmented as to be useless; if the viscosity is too high, the solution does not disperse sufficiently and the product is too thick to give adequate meat fibre simulation. Viscosity can be varied by varying the concentration of protein in the aqueous solution of protein isolate, or by dispersing varying amounts of oil or fat in the aqueous solution of protein isolate with varying degrees of fineness of dispersion or by varying the pH value of the aqueous solution of protein isolate. The pH value may affect the hardness of the coagulated protein, for instance in case soy proteins are used. Lower pH values of the aqueous protein isolate solution give a harder coagulated protein than higher pH values, and vice versa.

By operating at a pH value between 4.0 and 6.0, preferably between 4.8 and 5.4 the soya protein isolate solution of our British Pat. No. 1,265,661 has adequate viscosities. Where a soya protein solution of 27% containing 2–5% sodium chloride is used, a viscosity below 10 poise at a shear rate of 7 sec$^{-1}$ at 20° C is suitable.

When for example blood plasma was used an apparent viscosity which was lower than about 200 centipoise at 20° C at a shear rate of 7 sec$^{-1}$ for a solution containing about 30% protein gave good results.

According to the invention the proteinaceous material is added as discrete portions, particularly drops. The volume of the portions, respectively drops, can vary according to the required size of the elements and the application for example as food component. Portions of 0.005–0.5 ml, preferably 0.01–0.1 ml, more preferably between 0.01–0.06 ml, are added to the coagulating medium.

It should be understood that drops even smaller than 0.005 ml can be produced, but for most application this size of drops will give elements which are too small to meet the requirements mentioned before.

Using portions between 0.1–0.5 ml it is possible to obtain useful elements but as the portion size increases it becomes gradually more difficult to get elements with the desired properties. Besides the process conditions in particular the velocity of the flow of the coagulating medium has to be adapted in such a way that the material originating from relatively big portions can sufficiently diffuse in the coagulating medium to obtain elements with a greatly increased surface area, before complete coagulation takes place. The portions to be added can be provided by any device commonly used by the man skilled in the art, e.g. a tap. For instance we used hypodermic needles.

It is sometimes convenient, when carrying out the process of the present invention, to introduce into the same stream of coagulating medium, drops of protein-containing liquid which vary in size and/or in respect of the type of protein present and viscosity, so that there is produced a mixture of elements of varying characteristics, e.g. of different hardness and of different shapes. Fats, flavouring, salts, colouring materials and preservatives may also be present in the protein-containing liquid.

To obtain the desired elements with substantial increased surface area, preferably a stream of the coagulating medium is used.

The coagulating medium is preferably flowing along a substantially straight channel with substantially laminar flow. It is however possible to ensure a relative movement of the water and a protein isolate in other ways, for example by allowing a protein to drop through a certain depth of the coagulating medium or to employ a rotating, for example stirred mass of coagulating medium. Care should be taken that the relative movement of the coagulating medium and the protein is such that the elements formed retain their integrity (this is reached by stirring the coagulating medium very gently) and that substantially all the protein material originating from one portion can be found in the corresponding element formed. At the same time as the drops of protein solution are drawn out in the stream of coagulating medium, heat transfer from the hot medium coagulates the protein, to form elements which are removed from the coagulating medium, for example by filtering.

The obtained elements have a greatly increased surface area as compared to the surface area of the original portion added. By greatly increased is meant a ratio of at least 10:1, preferably 10–40:1.

This considerable increase in surface area is considered in the first place to be due to the use of discrete portions, particularly drops of the volume as described above.

The elements thus obtained are suitable for use in many applications. They may, if desired, be treated for the removal of surface moisture for example by air blowing or centrifuging. When so treated these elements form a fluffy mass which is easily distributed in the mass of binder and optionally finely divided meat and fat, to give reformed meat, by using conventional mixers. The elements may also be dried to such an extent that their total moisture content is below 10% by weight, e.g. 5% by weight.

The water content of the elements of the present invention when made from soya protein isolate appears to be optimal between 65 and 75% by weight of the elements. A higher water level reduces the mechanical strength of the elements, a lower water content makes them harder and provides a less satisfactory mouth feel. As far as can be ascertained, a water content of 45 to 75% by weight should in general be adequate.

The elements according to the invention can be made different in size and have mostly the shape of sheets or very ragged, convoluted membranes which are to a varying degree twisted or rolled. This is shown in FIG. 1. the elements of the invention can be formed in shapes and sizes which make them suitable for use instead of cooked meat fibres previously proposed for use in meat-simulating products. Elements suitable for this purpose have a thickness which is between 10–100 microns, preferably between 20–30 microns, a length of 10–50 mm, preferably 10–30 mm, a width of 1–10 mm (that is the width of an element as formed in the coagulating medium, when removed from the medium the elements will appear narrower as a result of folding or rolling up). The density of the elements is in most cases about 1 grm/ml.

Elements about 10 mm long and having a width of about 2 mm are suited to form the structure-imparting component in simulated chicken meat and simulated minced beef. Elements about 30 mm long and with varying widths from 5 to 10 mm are suitable for simulated beef.

The relatively large surface area of the elements of the present invention, together with their ramified edges and folded or twisted condition, all contribute to their liquid-retaining properties which are several times greater than those of previously proposed rod-shaped fibres, and hence provide a much better impression of succulence during eating than do the previously prepared rod-shaped fibres. This is further enhanced if the elements also have surface irregularities or pores. The fine structure of the elements also appears to give a greatly improved mouth feel compared with known extruded fibres.

The present invention also includes meat-simulating products comprising a mass of the above described elements. Such products may be made by mixing the elements with a binder such as egg albumen, finely divided raw meat or a vegetable protein solution. They can also be made by causing the elements to unite with each other mechanically, or to felt. In most cases suitable amounts of fat, flavouring, colouring and salts will be added.

This property of felting together which is possessed by the elements of the present invention, especially the felting together of oriented or substantially parallel elements, is believed to be 'unique in synthetic structure-imparting components in meat-simulating products, as is also the resulting meat-like mass.

When the elements of the present invention are to be felted together to form a meat-simulating mass, it is desirable to orient the elements so that the major dimensions of all elements are substantially parallel to each other, which can be done in the following stream of coagulating medium, by having obstacles such as relatively thin rods or shafts projecting into the bath, which rods or shafts will arrest the elements while the flowing coagulating medium orients them. The masses of elements formed round such rods or shafts are periodically removed, placed in contact with, and parallel to, each other and subjected to mechanical pressure to expel water and produce a meat-like structure.

The following examples illustrate the invention:

EXAMPLE I

Preparation of Elements from Soya Protein

Preparation of the starting material.

A soyabean meal defatted by a low temperature solvent extraction was made into a slurry with water-containing 0.1% of sodium sulphite and 0.03% by weight of a silicone anti-foam solution. The slurry was agitated for 30 minutes and then centrifuged (15000 × g). The supernatant liquid was separated and adjusted at pH 4.8 by careful addition of HCl and the precipitate that formed was separated by centriguation (15000 × g). The soya protein isolate thus obtained had the following composition:

Total solids 50%, of which
44.5% consisted of protein,
4.5% of organic non-protein material (mainly carbohydrates) and
1% ash solids and
water — 50%.

The soy protein (1080 grm) was gradually mixed in a Hobart planetory mixer with sodium chloride (42 grm) and further water (878 grm).

This brine was added to the isolate over 15 minutes and the product was filtered through a sieve to obtain a protein solution of pH 4.8 with a dissolved protein content of about 25% with practically no suspended material.

Equipment and Process Conditions

Figure 2:
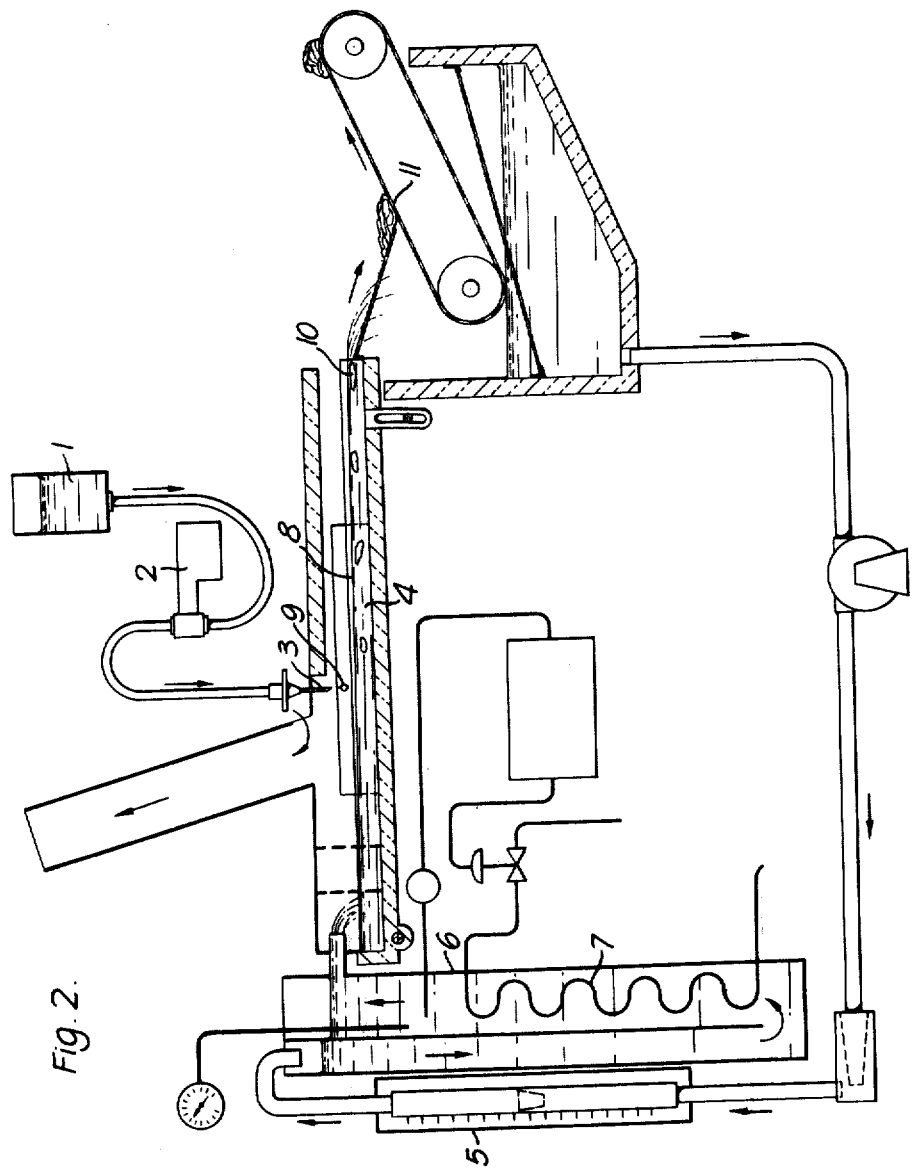
FIG. 2 shows a drawing of the apparatus used for the production of the elements according to the invention.

The equipment used is illustrated in the drawing. (FIG. 2) The equipment consists essentially of a reservoir 1 for the protein solution to be used which is connected via a pumping system 2 (Metering Pump LW) to hypodermic needles 3 of sizes 10G–16G, and a substantially horizontal jacketed channel 4 with recirculating setting water which was connected via a flow meter 5 to a water tank 6 with heating coil 7. The ends of the needles were situated 3.5–9.5 cm about the water-surface. A uniform laminar flow of water 8 (water velocity 5–20 cm/sec.) was established. The bath temperature was held constant at 94°C ± 0.2°C. The water depth in the channel was 3 cm. Dow Corning Antifoam M10 emulsion was added to the water system to give a concentration of 200 ppm.

Drops 9 of the soya protein solution (25% protein) with a diameter of 2–4 mm were dropped at a rate of 90–120 drops/min. The elements 10 were collected in a mesh basket, drained of residual bath water and washed with clean cold water. The material was drained and then dried at 1000 rpm for 4 minutes. The material contained about 63% moisture. The elements obtained had a surface-area which was at least 10 times the surface area of the original drops.

EXAMPLE II

Production of Elements Starting from Blood Plasma Proteins

100 Liter of fresh ox blood was collected and made 0.02 wt% with sodium citrate (as anticoagulant). The blood was filtered through a cheese cloth and the plasma separated from red cells using an Alfa Laval Model 36E cream separator. The plasma was concentrated to a protein concentration of about 30 wt% by ultrafiltration. Sodium chloride was added to approx. 4 wt% (on water) and the pH carefully adjusted to 4.8 with dilute HCl.

The resulting protein solution had an apparent viscosity below 200 centi poise at 20° C at a shear rate of 7 sec$^{-1}$. Drops of 0.03–0.04 ml were dropped into a stream of hot water using the same apparatus and reaction conditions as described above. Elements with a surface area which was at least 10 times greater than the surface area of the added drops were obtained and were suitable for incorporation into a meat-like product.

EXAMPLE III

Production of Elements Starting from Proteins of the Sarcoplasmic Reticulum of Beef Muscle 15 kg. of minced forequarter beef was homogenised for 20 minutes in 100 liter chilled water. The extract clarified on standing and the clear supernatant containing sarcoplasmic proteins were concentrated by ultrafiltration at 20° C to a final concentration of about 10 wt.%. Solid sodium chloride was added to a concentration of about 4 wt.% and the pH adjusted to 4.8 with dilute hydrochloric acid. The protein solution had an apparent viscosity of 5 centi poise at 7 sec$^{-1}$ and 20° C. Drops of 0.03–0.04 ml were introduced in a stream of hot water using the same apparatus and process conditions as described in Example I. The elements obtained had a surface area which were at least 10 times greater than the surface area of the original drops.

EXAMPLE IV

Production of Elements Starting from a Solution which Contains Soya Proteins and Blood Plasma Proteins A solution of soya protein containing about 27 wt.% protein and 4 wt.% NaCl with a pH of 4.8 was prepared. Whole ox blood was subjected to centrifugation at 10.000 g for 15 mins. and the supernatant plasma decanted. Sufficient NaCl and hydrochloric acid were carefully added to the plasma to obtain a solution at pH 4.8, containing 4 wt% NaCl, and about 7 wt.% protein.

Equal volumes of the soya and plasma solutions were mixed to form a solution of apparent viscosity lower than 200 c.poise at a shear rate of 7 sec$^{-1}$. This material was introduced dropwise (0.03–0.04 ml drops) into a stream of hot water under the same conditions and using the same apparatus as in Example I. The elements obtained had a surface area which was at least 10 times greater than the surface area of the original drops.

EXAMPLE V

Productions of Elements Starting from a Solution Containing Soya Proteins and Sarcoplasmic Proteins Derived from Muscle A solution containing about 9% muscle protein, 4% sodium chloride (pH 4.8) was prepared.

A soy protein solution containing 27 wt% protein, 4 wt.% salt, at a pH of 4.8 was prepared as described in Example I. Equal volumes of the two solutions were mixed to form a solution with a viscosity lower than 200 centi poise at 7 sec$^{-1}$ 20° C and introduced (as drops of 0.03–0.04 ml) into a stream of hot water under the same conditions and using the same apparatus as described in Example I.

Elements were formed which had a surface area which was at least 10 times greater than the surface area of the original drops.

EXAMPLE VI

Production of Elements Starting from a Solution Containing Proteins Derived from Meat Muscle A solution of meat muscle proteins containing about 5% protein (pH 7.0) with an apparent viscosity below 10 centi poise at shear rate of 7 sec$^{-1}$ at 20° C was added dropwise (as drops of 0.03–0.04 ml) to a stream of hot water under the same conditions and using the same apparatus as described in Ex.1. Elements were obtained which had a surface area which was at least 10 times greater than the surface area of the added drops.

EXAMPLE VII

Production of Elements Starting from a Solution of Proteins Derived from Whole Blood.

A 4% solution of proteins derived from whole blood, pH 4.8, apparent viscosity 250 centi poise at a shear rate of 7 sec$^{-1}$ and 20° C were added dropwise (as drops of 0.03–0.04 ml) under the conditions and using the same apparatus as described in Example I.

The elements obtained had a surface area which was at least 10 times greater than the surface area of the original drops.

EXAMPLE VIII

Production of Elements Starting from a Solution Containing a Mixture of Soya Proteins and Sodium Caseinate A soya protein solution was prepared as in Example I to contain 27.5 wt.% protein, 3% NaCl (on water) at a pH of 4.8. A second solution, containing 20 wt% sodium caseinate and 4 wt.% chloride at a pH of about 4.8 was also prepared. A protein solution containing 25 g of the caseinate and 75 g of the soya solution was prepared with an apparent viscosity of 840 centi poise at a shear rate of 7 sec$^{-1}$. This solution was added dropwise (0.03–0.04 ml) to a stream of hot water under the same conditions and using the same apparatus as described in Example I.

The elements obtained had a surface area which was at least 10 times greater than the surface area of the original drops.

EXAMPLE IX

Production of Elements Starting from a Solution of Proteins Derived from Fish

A solution containing about 9% fish proteins (pH 8.9) was introduced dropwise (drops of 0.03–0.04 ml) into a stream of hot water (bath temperature above 90° C) containing dissolved calcium chloride at a concentration of 10 mM or greater, which concentration was kept constant throughout the process. Using the same apparatus as described in Example I, elements were obtained which had a surface area which was at least 10 times greater than the surface area of the original drops.

EXAMPLE X

Preparation of Elements Starting from a Solution of Proteins Derived from Meat.

A 6% solution of meat proteins (pH 9.0) was prepared. The apparent viscosity of the solution was below 10 c.poise at a shear rate of 7 sec$^{-1}$ at 20° C. This material was added dropwise (drops of 0.03–0.04 ml) into a stream of water at a temperature above 90° C, which contains 10 mM of calcium chloride. The elements obtained had a surface area which was at least 10 times greater than the surface area of the original drops.

EXAMPLE XI

Preparation of Elements Starting from a Solution Containing Proteins of the Sarcoplasmic Reticulum of Beef Muscle.

A solution was prepared according to the procedure described in Example III. This solution was added dropwise (drops of 0.03–0.04 ml) to a hot stream of water containing 10 mM calcium chloride. And using the same apparatus and conditions as described in Example I.

The elements obtained had a surface area which was at least 10 times the surface area of the original drops.

EXAMPLE XII

Preparation of Elements Starting from a Solution Containing Sarcoplasmic Proteins from Beef Muscle A solution was prepared according to the general procedure of Example III. Taking to pH 11 with sodium hydroxide and added dropwise (drops of 0.03–0.04 ml) into a hot stream of water containing 4% sodium chloride (pH 2–3) and a temperature above 90° C give elements with a surface area which was at least 10 times greater than the surface area of the added drops.

EXAMPLE XIII

The same experiments as described in Examples I–XII were repeated using drops of sizes varying from 0.03 ml to 0.1 ml, whereby in each case the velocity of the stream of coagulating medium and the dropping height were adapted. Similar elements with greatly increased surface area were obtained.

EXAMPLE XIV

The same experiments as described in Examples I–XIII were repeated using instead of the laminar flow a turbulent flow of the coagulating medium which was generated by a magnetic stirrer in a circular recipient. Similar elements with greatly increased surface area were obtained.

EXAMPLE XV

Preparation of a Felted Analogue

A solution was made up essentially as in Example I.

Optionally the solution could have colouring matter added e.g. caramel at 1–2% on foodstuff colouring lakes at about 0.5%.

This dope was dripped from a square ended 12G stainless steel hypodermic needle tube into water flowing at approximately 140 mm/g at approximately 94° C c at a depth of approximately 20 mm.

Optionally two dripping systems were used with the needles closely side by side, one dripping uncoloured dope at a slow rate, the other at a normal rate of 1–2 drops/s.

The elements formed in the water were caught on a 1 mm diameter metal rod rising up approximately 10 mm from the floor of the trough some 100 mm down stream from the dope dropping point. The material formed a mat of material with substantial and natural looking alignment. The mat was arranged with other mats in a metal mould substantially parallel into each other beside and above.

Optionally one large mat was grown and put in the mould. When the mould was substantially full at a thickness of approximately 10 mm the material was compressed at 500 kN/m$^2$ between paper towelling to avoid a glossy surface on the final sheet of material 3–5 mm thick.

Optionally plastic sheet or bare metal can be used in the compression. The compressed sheet of material was soaked for a few minutes in a flavour/texturising bath.

Optionally the flavour bath contents may be poured over the sheet.

The sheet was allowed to drain before being soaked in a binder bath for a few minutes.

Optionally the bath contents may be poured over the sheet. The sheet was allowed to drain. The sheet was heatset in steam for 10 minutes.

Optionally texture can be adjusted by heat setting under pressure. The analogue was stored frozen. When cooked in gravy and vegetables the analogue looked, chewed and swallowed like a slice of H-bone beef.

EXAMPLE XVI

Preparation of a Seafood Analogue

The product was prepared by filling Densothene pouches with 100 g elements of soya protein and 200 ml of a flavouring and texturising fluid, consisting of the following ingredients:

| | % | |
|---|---|---|
| natural seafood extracts | 3.0 – 4.0 | |
| seafood flavours | 1.5 – 3.0 | pH 5.8 – 6.2 |
| salt | 0.1 – 0.3 | |
| water | 95.4 – 92.7 | |

The packs were sealed and stored frozen at −20° C until required for use.

A seafood analogue cocktail was prepared by having out the packs (in cold water for 30–40 minutes), draining all the fluid which was discarded and mixing the drained material with a sauce dressing made of

| | |
|---|---|
| mayonaise | 94.9% |
| tomato ketchup | 5.0% |
| lemon juice | 0.1% |

The ratio of materials were 25 g elements from soya protein to 75 g dressing.

The product was served cold and very closely resembled the appearance, texture and flavour of white crab meat or shredded lobster meat (depending on the type and flavour blend used in the treatment fluid).

If so desired a "semi analogue" product can be prepared by blending the elements of soya protein with lobster or crab meat.

I claim:

1. A process for the preparation of a proteinaceous fibrous foodstuff comprising the steps of:
   1. adding dropwise 0.005 ml to 0.5 ml of a coagulable protein solution into a coagulating medium under conditions ensuring a relative movement of both the material added and the coagulating medium, whereby the material added is drawn out to form a product which has at least a ten fold increased surface area as compared with the surface area of the material added, and
   2. collecting from the coagulating medium the coagulated product.

2. A process according to claim 1, wherein drops of 0.01 to 0.1 ml of protein solution are added.

3. A process according to claim 2, wherein drops of 0.01 to 0.06 ml of the protein solution are added.

4. A process according to claim 1, wherein the material added is drawn out by a substantially laminar flow of coagulating medium.

5. A process according to claim 1, wherein the material added is drawn out by a turbulent flow of coagulating medium.

6. A process according to claim 1, wherein the relative movement of both the material added and the coagulating medium is such that the product formed retains its integrity.

7. A process according to claim 1, wherein the material added is coagulated by hot water.

8. A process according to claim 1, wherein the material added is coagulated by an aqueous solution of chemical agents.

9. A process according to claim 1, wherein the material added is coagulated by the combined action of heat and chemical agents present in the coagulating medium.

10. A process according to claim 9, wherein an aqueous solution containing a divalent cation is used as a chemical coagulating agent.

11. A process according to claim 9, wherein an aqueous solution of an acid is used as a chemical coagulating agent.

12. A process according to claim 1, wherein the protein solution added contains at least one globular protein.

13. A process according to claim 1, wherein the protein solution added contains at least one myofibrillar protein.

14. A process according to claim 1, wherein the protein solution added contains a mixture of at least one globular and at least one myofibrillar protein.

15. A process according to claim 1, wherein a protein solution containing soy protein in a concentration between 25 and 35% protein and 2 to 5% sodium chloride at a pH between 4 and 6 is added to the coagulating medium.

16. A process according to claim 15, wherein the protein solution has a pH between 4.8 and 5.4.

17. A process according to claim 15, wherein the material is introduced in water at a temperature between 91° and 98° C.

* * * * *